(12) United States Patent
Batchelder

(10) Patent No.: US 10,471,631 B2
(45) Date of Patent: Nov. 12, 2019

(54) ELECTROHYDRODYNAMIC ADDITIVE MANUFACTURING SYSTEMS AND METHODS FOR HIGH TEMPERATURE MODELING

(71) Applicant: Stratasys, Inc., Eden Prairie, MN (US)

(72) Inventor: J. Samuel Batchelder, Somers, NY (US)

(73) Assignee: STRATASYS, INC., Eden Prairie, MN (US)

( * ) Notice: Subject to any disclaimer, the term of this patent is extended or adjusted under 35 U.S.C. 154(b) by 334 days.

(21) Appl. No.: 15/378,767

(22) Filed: Dec. 14, 2016

(65) Prior Publication Data

US 2017/0197360 A1 Jul. 13, 2017

Related U.S. Application Data

(60) Provisional application No. 62/276,469, filed on Jan. 8, 2016.

(51) Int. Cl.
 *B29C 33/52* (2006.01)
 *B29C 31/04* (2006.01)
 (Continued)

(52) U.S. Cl.
 CPC ............ *B29C 33/52* (2013.01); *B29C 31/047* (2013.01); *B29C 64/112* (2017.08);
 (Continued)

(58) Field of Classification Search
 CPC ...................................................... B29C 33/52
 See application file for complete search history.

(56) References Cited

U.S. PATENT DOCUMENTS 6,437,034 B2 8/2002 Lombardi et al.
8,123,999 B2 2/2012 Priedeman, Jr. et al.
(Continued)

*Primary Examiner* — Larry W Thrower
(74) *Attorney, Agent, or Firm* — Westman, Champlin & Koehler, P.A.

(57) ABSTRACT

A method to form a part in an additive manufacturing system includes providing a melt pool configured to retain and dispense an electrically resistive consumable material and an array of channels in fluid communication with the melt pool. The method includes providing an array of channels in fluid communication with the melt pool, where each of the array of channels have a hollow electrically conductive nozzles wherein each of the array of nozzles is coupled to a distal end of one of the array of channels such that the consumable material can flow from the melt pool to each of the nozzles. The method includes providing a grid spaced from of the array of nozzle array wherein the grid defines a uniform ground potential, wherein the ground potential of the grid is substantially the same as a potential of the part being printed and the consumable material spaced from the grid. A plurality of drivers is in electric communication with the array of nozzles wherein each of the drivers is configured to modulate a voltage of a single nozzle of the array of nozzles wherein a difference in voltage from the array of nozzles to the ground potential allows passage of droplets of the consumable material to be ejected from each nozzle and pass through the grid, whereby electrostatic distortions of a drop from each nozzle selectively launches drops of support in response to changes of the potential of a nozzle by its driver such that consumable material is deposited in a layer by layer manner to form a portion of a mold for a part. The method includes depositing molten part material within the mold.

13 Claims, 4 Drawing Sheets

(51) Int. Cl.
  *B33Y 10/00*  (2015.01)
  *B33Y 30/00*  (2015.01)
  *B33Y 50/02*  (2015.01)
  *B29C 64/112*  (2017.01)
  *B29C 64/386*  (2017.01)
  *B29C 64/40*  (2017.01)
  *B29L 31/00*  (2006.01)

(52) U.S. Cl.
  CPC ............ *B29C 64/386* (2017.08); *B29C 64/40* (2017.08); *B33Y 10/00* (2014.12); *B33Y 30/00* (2014.12); *B33Y 50/02* (2014.12); *B29L 2031/757* (2013.01)

(56) References Cited

U.S. PATENT DOCUMENTS

| | | |
|---|---|---|
| 8,245,757 B2 | 8/2012 | Crump et al. |
| 8,246,888 B2 | 8/2012 | Hopkins et al. |
| 8,459,280 B2 | 6/2013 | Swanson et al. |
| 2008/0169585 A1 | 7/2008 | Zinniel |
| 2011/0186081 A1 | 8/2011 | Dunn et al. |

ELECTROHYDRODYNAMIC ADDITIVE MANUFACTURING SYSTEMS AND METHODS FOR HIGH TEMPERATURE MODELING

CROSS REFERENCE TO RELATED APPLICATION(S)

The present application claims the benefit of U.S. Provisional Patent Application Ser. No. 62/276,469 entitled ELECTROHYDRODYNAMIC ADDITIVE MANUFACTURING SYSTEMS AND METHODS FOR HIGH TEMPERATURE MODELING which was filed on Jan. 8, 2016, the contents of which are incorporated by reference in its entirety.

BACKGROUND

The present disclosure relates to additive manufacturing systems for printing or otherwise building three-dimensional (3D) parts or objects with layer-based, additive manufacturing techniques.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

The additive manufacture of 3D parts typically involves the formation of a 3D part from a digital representation of the 3D part in a layer-by-layer manner. Supporting layers or structures are typically built underneath overhanging portions of the 3D part, which are not supported by the part material itself, or in cavities of 3D parts under construction.

There are various metallic salts, such as sodium chloride, that are candidates for soluble support materials for additive manufacturing, such as described in Lombardi et al., U.S. Pat. No. 6,437,034, for WATER SOLUBLE RAPID PROTOTYPING SUPPORT AND MOLD MATERIAL and in Crump et al, U.S. Pat. No. 8,245,757, for INORGANIC IONIC SUPPORT MATERIALS FOR DIGITAL MANUFACTURING SYSTEMS. Exemplary advantages to the use of such metallic salts as support material in an additive manufacturing process include low cost, high melt point, good strength, and excellent solubility. However, conventional additive manufacturing systems are limited in the ability to precisely and quickly depositing metallic salts that are candidates for soluble support materials or for modeling materials.

SUMMARY

The present disclosure relates to a method to form an object in an additive manufacturing system. The method includes providing a melt pool configured to retain and dispense a consumable material and an array of channels in fluid communication with the melt pool. The method includes providing an array or channels in fluid communication with the melt pool, where each of the array of channels have hollow electrically conductive nozzles wherein each of the array of nozzles is coupled to a distal end of one of the array of channels such that the consumable material can flow from the melt pool to each of the nozzles. The method includes providing a grid spaced from of the array of nozzles wherein the grid defines a uniform ground potential, wherein the ground potential of the grid is substantially the same as a potential of the part being printed and the consumable material spaced from the grid. A plurality of drivers is in electric communication with the array of nozzles wherein each of the drivers is configured to modulate a voltage of a single nozzle of the array of nozzles wherein a difference in voltage from the array of nozzles to the ground potential allows passage of droplets of the consumable material to be ejected from each nozzle and pass through the grid to the accumulating object, whereby electrostatic distortions of a drop from each nozzle selectively launches droplets of the consumable material in response to changes of the potential of a nozzle by its driver such that consumable material is deposited in a layer by layer manner to form a portion of a mold for a part. The method includes depositing molten part material within the mold.

The present disclosure also relates to an additive manufacturing system apparatus for incrementally forming an object in a layer by layer manner. The system includes a melt pool configured to retain a selected amount of consumable material and an array of channels in fluid communication with the melt pool. The system includes an array of hollow electrically conductive nozzles wherein each of the array of nozzles is coupled to a distal end of one of the array of channels such that the consumable material can flow from the melt pool to each of the nozzles. The system includes a plurality of drivers in electric communication with the array of nozzles wherein each of the drivers is configured to modulate a voltage of a single nozzle of the array of nozzles and a grid spaced from the array of nozzles. The grid defines a uniform ground potential, wherein the ground potential of the grid is substantially the same as a potential of an accumulating object spaced from the grid, and wherein a difference in voltage from the array of nozzles to the ground potential allows passage of droplets of the consumable material to be ejected from each nozzle and pass through the grid to the accumulating object, whereby electrostatic distortions of a drop from each nozzle selectively launches droplets in response to changes of the potential of a nozzle by its driver.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

As mentioned above, there are various metallic salts, such as sodium chloride, that are candidates for soluble support materials for additive manufacturing. However, such salts are not easily dispensed with speed and precision. They can be too hot in their molten state for the piezoelectric (PZT) drivers used in some types of drop-on-demand printing. Additionally, such metallic salts are corrosive in contact with many of the materials used in jetting heads. Furthermore, because of its low melt viscosity, molten salt is not readily deposited with the FDM process.

Embodiments of the present disclosure are directed to systems and methods of forming 3D parts comprising an electrohydrodynamic (EHD) printing process. In the EHD printing process, shaped electrostatic fields create hydrostatic pressure or motion in the molten consumable material (part and/or support material) to deliver drops of the ionized molten material through one or more nozzles onto a build platform to form the part and/or support portions. The size of the drops can be several orders of magnitude smaller than the nozzle size. As a result, embodiments of the EHD drop-on-demand part manufacturing process disclosed herein may be used to form 3D parts and/or support portions at a very high resolution.

Figure 1:
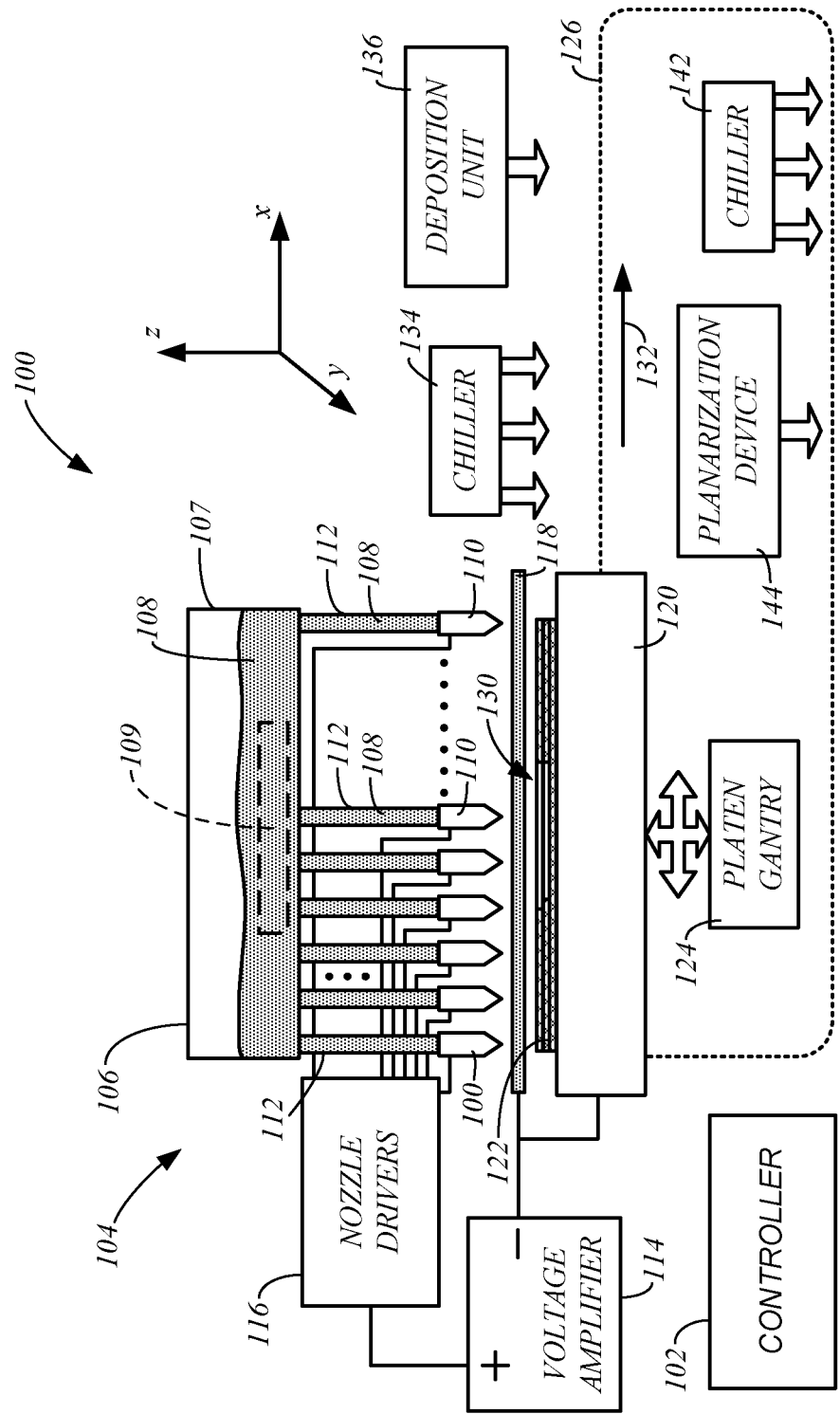
FIG. 1 is a simplified diagram of an exemplary additive manufacturing system, in accordance with embodiments of the present disclosure.

FIG. 1 is a simplified diagram of an exemplary additive manufacturing system 100 in accordance with embodiments of the present disclosure. In some embodiments, the system 100 includes a controller 102, which represents one or more processors that are configured to execute instructions, which may be stored locally in memory of the system 100 or in memory that is remote to the system 100, to control components of the system 100 to perform one or more functions described herein. In some embodiments, the controller 102 includes one or more control circuits, microprocessor-based engine control systems, and/or digitally-controlled raster imaging processor systems, and is configured to operate the components of the system 100 in a synchronized manner based on printing instructions received, for example, from a host computer or a remote location. In some embodiments, the controller 102 may receive sliced layers of a desired 3D part or support structure, thereby allowing the system 100 to produce the 3D part and/or support structures, such as in a layer-by-layer manner, for example.

In some embodiments, the system 100 includes an EHD print unit 104 configured to perform a drop-on-demand part manufacturing process to precisely build support portions for use in forming a 3D part and/or part portions of the 3D part. In some embodiments, the EHD print unit 104 is configured to form support portions that define a mold cavity of a 3D part, as described in greater detail below.

In some embodiments, the EHD print unit 104 includes a source or melt pool 106 of molten or fluid consumable material 108. In some embodiments, the source 106 is in the form of a melt pool that is configured to retain and/or generate the molten or fluid consumable material 108. In some embodiments, the melt pool includes a container 107 that holds the molten or fluid consumable material 108 for dispensing. In some embodiments, the container 107 includes a heater 109 (e.g., heating elements, heat tubing, etc.) that maintains the molten or fluid state of the material 108, and/or transforms a solid material into the molten or fluid consumable material 108. The heater 109 may be located within the container 107 (FIG. 1), positioned below the container 107, and/or along the sides of the container 107. The heater 109 may be controlled by the controller 102, such as based on a temperature signal output from a temperature sensor that is indicative of the temperature of the material 108 within the container 107, for example.

In some embodiments, the material 108 is electrically resistive. In some embodiments, the material 108 is support material for forming support portions that assist in the formation of a 3D part. In some embodiments, the support material comprises metallic salts, such as but not limited to sodium chloride. Other exemplary support materials that may be used as the material 108 include those disclosed in Lombardi et al. (U.S. Pat. No. 6,437,034) and Crump (U.S. Pat. No. 8,245,757). Other suitable materials 108 may also be used.

Figure 2:
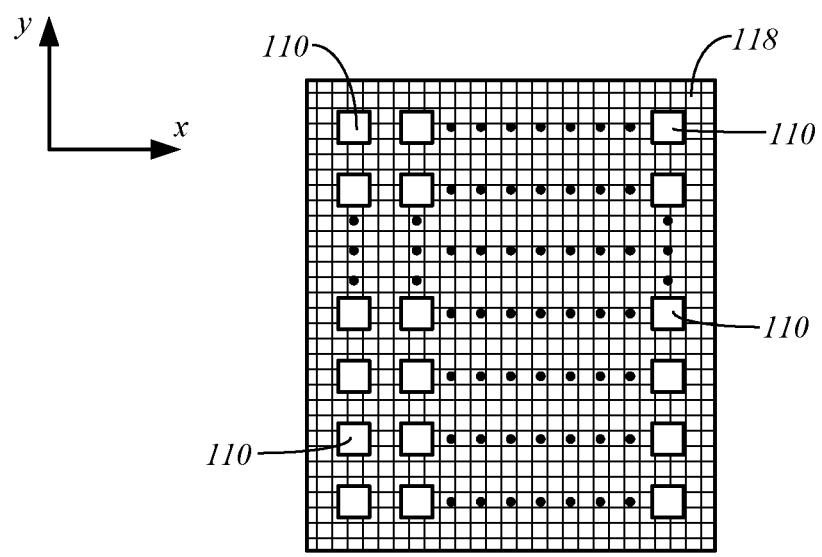
FIG. 2 is a simplified top view of an exemplary array of electrically conductive nozzles over a grid, in accordance with embodiments of the present disclosure.
Figure 3:
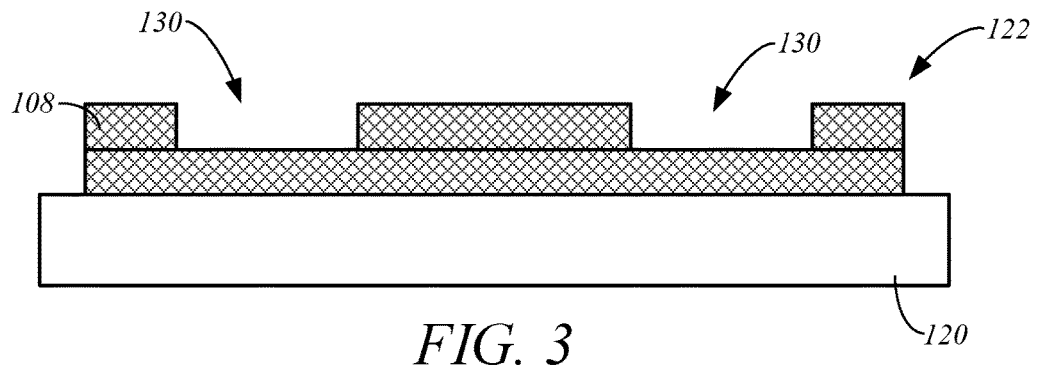
FIGS. 3-7 are simplified side cross-sectional views of a structure at various stages of production of a 3D part, in accordance with embodiments of the present disclosure.

In some embodiments, the EHD print unit 104 includes one or more electrically conductive nozzles 110, each of which is configured to receive the molten or fluid support material 108 from the melt pool 106 through a corresponding channel 112, as shown in FIG. 1. In some embodiments, the EHD print unit 104 includes a plurality of the nozzles 110. In some embodiments, the nozzles 110 are arranged in an array, as illustrated in the simplified top view of a portion of the EHD print unit 104 provided in FIG. 2. In some embodiments, the array of nozzles 110 are distributed within a plane defined by the x-axis and the y-axis, as indicated in FIG. 2. The array of nozzles 110 may take on other shapes and configurations than that illustrated in FIG. 2.

In some embodiments, the EHD print unit 104 includes a voltage amplifier 114, nozzle drivers 116, and a grid 118. The voltage amplifier 114 generates a high electrical potential difference between the nozzle drivers 116 and the grid 118. In some embodiments, the grid 118 and the build platform 102 are at a common electrical potential. In some embodiments, the grid 118 includes an isolated ring electrode for each of the nozzles 110 that is positioned immediately below the corresponding nozzle 110. The electrical potential of each of the ring electrodes of the grid 118 is controlled independently using from the other ring electrodes using any suitable arrangement, such as through an array of switches that selectively couple the individual ring electrodes to the voltage amplifier 114, for example.

In some embodiments, the nozzle drivers 116 modulate the voltage supplied by the voltage amplifier 114 to each of the nozzles 110 individually. This selective modulation of the voltage to the nozzles 110 allows for precise control of the discharge of drops of the support material 108 from each of the nozzles 110 to a build platform 120, which, in some embodiments, is at the same electrical potential as the grid 118. The drops of the support material 108 are attracted to the grid 118 and the build platform 120. The individual drops of the support material 108 drop in a precise manner through the grid 118 to the build platform 102 to form a support structure 122, an exemplary cross-sectional view of which is shown in FIG. 1. An existing support structure 122 on the build platform 120 is also at the common potential of the build platform 120 and the grid 118. As a result, drops of the support material 108 are also precisely dropped on to the existing support structure 122, if present. Thus, the EHD print unit 104 can precisely control the average diameter of the discharged drops of the support material 108 within a range of about 10 µm and about 100 µm, to accurately form the desired support structure 122 on the build platform 120.

During the above-described drop-on-demand process, the adjacent nozzles 110 in the array are subject to high potential differences (e.g., several thousand volts) while the nozzles are electrically shorted by the support material 108 in the channels 112 connecting each nozzle 110 to the support material 108 retained by the source or melt pool 106. The conductivity of molten salts is on the order of 1/(ohm cm), or about $10^5$ lower than molten aluminum. In some embodiments, the channels 112 may have an inner diameter of about 100 microns and are about 20 cm in length. Such a column of molten salt would have an electrical resistance of about 250 Kohm. For such an arrangement, a 5 KV difference between adjacent nozzles 110 might be expected to dissipate 100 watts. However, other dimensions of the channels 112 are also within the scope of the present disclosure.

It is also contemplated that a diameter of the droplet can be varied by manipulating the voltage differential. For instance, a nozzle having a 100 µm diameter can drop a droplet, such as a pendant drop, ranging from about 10 µm to about 100 µm in diameter. Thus, the present disclosure provides a nozzle that substantially prevents clogging.

In some embodiments, the system 100 includes a platen gantry 124 (FIG. 1) that is configured to move the build platform 120 vertically along the z-axis during the manufacture of the support structure 122. Thus, as layers of the support structure 122 are formed, the platen gantry 124 may lower the build platform 120 along the vertical or z-axis as necessary. Furthermore, as discussed in greater detail below, the platen gantry 124 may move the build platform 120 along the x-axis, such as along a build path 126, to allow for other processes to be performed on the support structure 122. Other configurations may also be employed.

In some embodiments, the support structure 104 defines a mold cavity 130 for forming a 3D part, and the system 100 is configured to deposit part material into the mold cavity 130 to form the 3D part. Exemplary embodiments of a method of producing a 3D part using embodiments of the additive manufacturing system 100 will be described with reference to FIGS. 3-7, which are simplified side cross-sectional views of a support structure 122 at various stages of the method.

In some embodiments, after the formation of a support structure 122 on the build platform 120, the platen gantry 124 moves the build platform 120 along the build path 126 in a feed direction 132, as indicated in FIG. 1. In some embodiments, the system 100 includes a chiller 134 that is configured to cool the support structure 122 on the build platform 120. Exemplary embodiments of the chiller 134 include a blower configured to produce air jets that blow over the top surface of the structure 122, and/or other suitable cooling devices.

Figure 4:
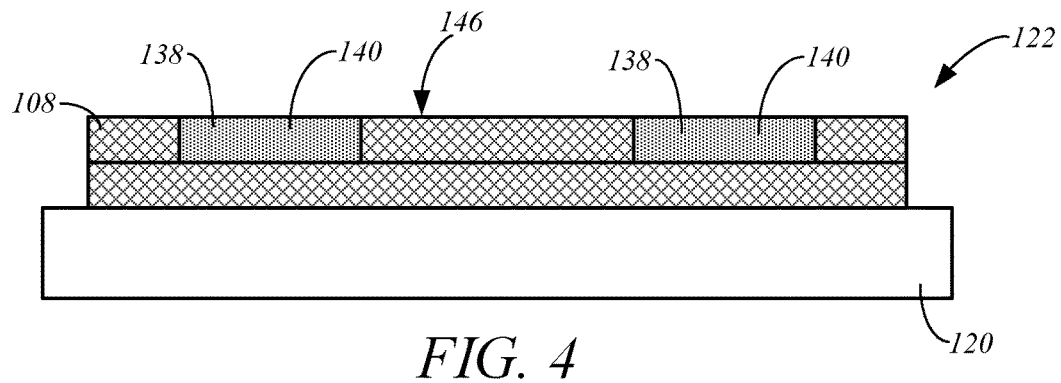
Figure 5:
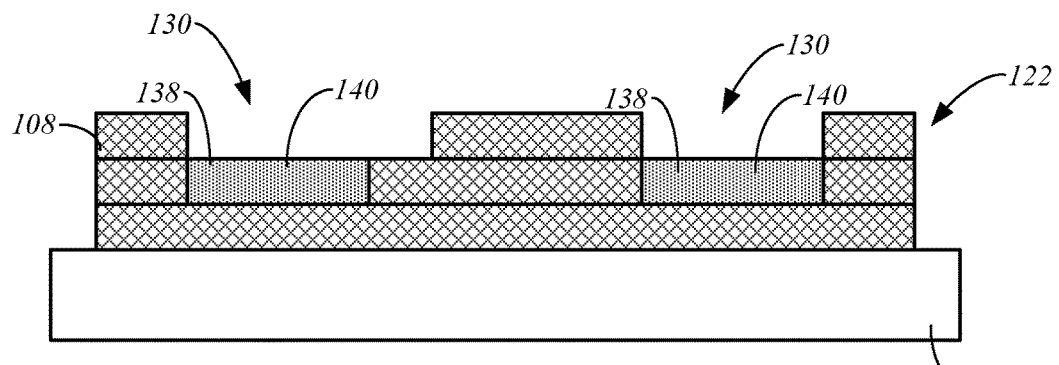

In some embodiments, the system 100 includes a deposition unit 136 that is configured to deposit part material into the cavity 130 of the support structure 122. In some embodiments, after the support structure 122 is sufficiently cooled by the chiller 134, the platen gantry 124 moves the build platform 120 along the build path 126, and the build platform 120 and/or the support structure 122 are registered with the deposition unit 136. The deposition unit 136 then deposits the part material 138 into the one or more cavities 130 of the support structure 122 to form part portions 140 in the cavities 130, as shown in FIG. 4.

The part material 138 can be any suitable part material. In some embodiments, the part material 138 has a melt point that is at a lower temperature than the melt point of the support material 108 forming the support structure 122. When the support material 108 is in the form of a metallic salt, such as sodium chloride, the part material 138 may comprise engineering grade materials, including metal having a high melt point temperature, such as 6061 aluminum or stainless steel or an engineering grade polymer such as polyetherketoneketone, for example.

In some embodiments, following the deposition of the part material 138 into the cavities 130 of the support structure 122, the platen gantry 124 moves the build platform 120 along the build path 126 to a chiller 142, as shown in FIG. 1. The chiller 142 may be formed in accordance with the embodiments of the chiller 134, and operates to cool the part material 138 and the support structure 122 to a desired temperature. In some embodiments, this cooling of the part material 138 solidifies at least a top surface of the part material 138.

In some embodiments, after cooling the part material 138, the platen gantry 124 moves the build platform 120 along the build path 126 to a planarization device 144. In some embodiments, the planarization device 144 is configured to planarize a top surface 146 of the part portions 140 and/or the support structure 122, which removes part material 138 and/or support material 108 from the top surface 146. Embodiments of the planarization device 144 include a grinder, a blade, or other conventional planarizing devices. In some embodiments, the planarization operation performed by the planarization device 144 ensures that the top surfaces 146 of the part portions 140 and the support structure 122 are substantially flat and are prepared to receive additional layers of the support material 108 and/or the part material 138 in subsequent EHD printing and molding processes.

Figure 6:
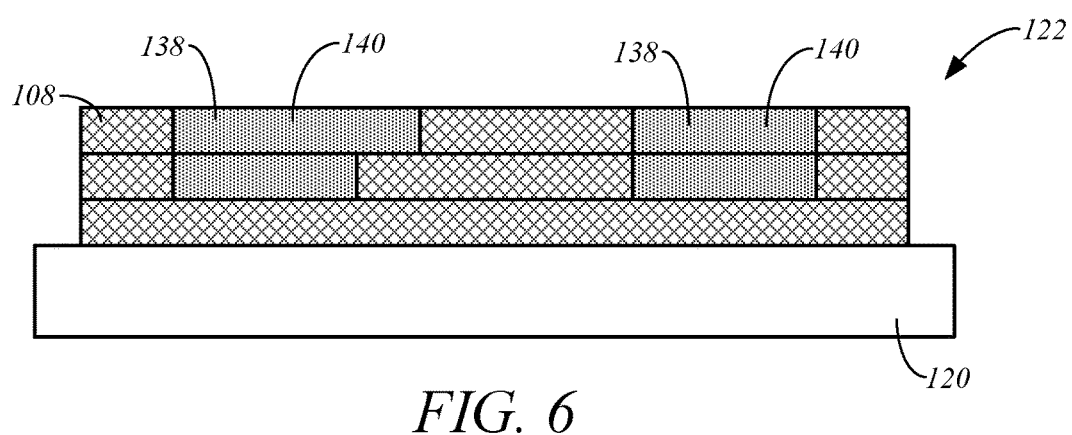
Figure 7:
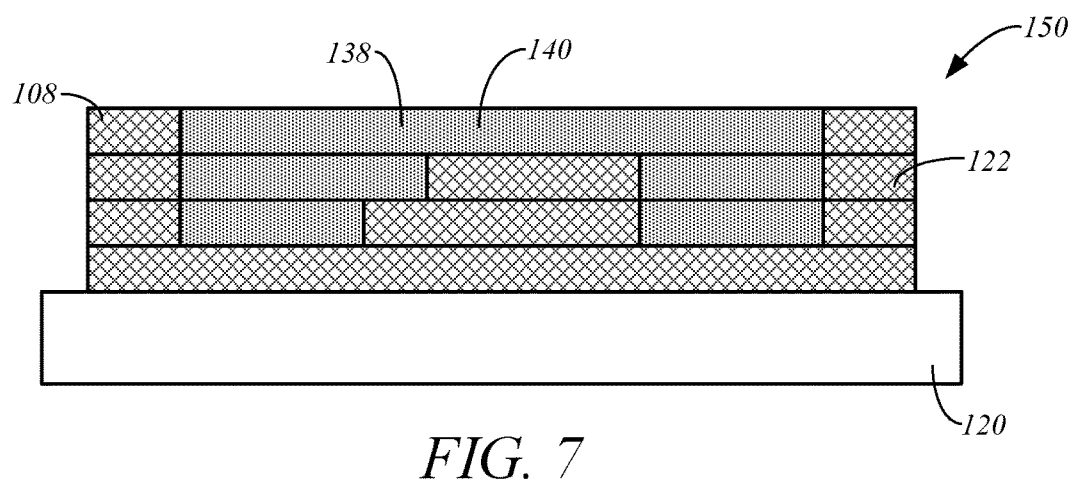

After the molding of the part portions 140 (FIG. 4), the platen gantry 124 returns the build platform 120 to the EHD print unit 104 for another round of drop-on-demand printing of a layer of support structure 122, in accordance with one or more embodiments described above. This can produce the exemplary support structure layer 122 having cavities 130 shown in FIG. 5. The platen gantry 124 can then move the build platform 120 along the build path 126 to deposit part material 138 into the cavities 130 using the deposition unit 136 to form the part portions 140 in the cavities 130, as shown in FIG. 6. Additional EHD printing and molding processes may be performed in this manner to further build the support structure 122 and part portions 140, to produce the support and part structure 150 shown in FIG. 7, for example.

After the desired structure 150 is completed, the structure 150 may be removed from the system 100 and undergo one or more operations to reveal the completed 3D part formed by the part molded part portions 140. For example, the support structure 122 may be sacrificially removed from the molded 3D part portions 140 using an aqueous-based solution. Under this technique, the support structure 122 may at least partially dissolve in the solution separating the support structure 122 from the molded part portions 140 in a hands-free manner.

Examples of suitable systems and techniques for removing the support structure 122 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

In comparison, the molded part portions 140 are chemically resistant to aqueous solutions. This allows the use of an aqueous solution for removing the sacrificial support structure 122 without degrading the shape or quality of the 3D part formed by the molded part portions 140.

Furthermore, after the support structure 122 is removed, the 3D part formed by the molded part portions 140 may undergo one or more additional processes, such as surface treatment processes. Examples of suitable surface treatment processes include those disclosed in Priedeman et al., U.S. Pat. No. 8,123,999; and in Zinniel, U.S. Publication No. 2008/0169585.

The above-described EHD printing process using embodiments of the system 100 allow for the quick and precise formation of the support structure 122, which defines a mold cavity for the desired 3D part. The support structure 122 may be formed in its entirety before proceeding with a molding process using the deposition unit 136 of the system 100, or separate molding devices. This allows for the molding of the desired 3D part in a single molding process. Alternatively, the support structure 122 is formed in a layer-by-layer manner (FIGS. 3-7), and the formation of each layer of the support structure 122 is followed by a molding process using the deposition unit 136, to form the desired 3D part.

Although the present disclosure has been described with reference to preferred embodiments, workers skilled in the art will recognize that changes may be made in form and detail without departing from the spirit and scope of the disclosure.

The invention claimed is:

1. An additive manufacturing system for incrementally forming a 3D object in a layer by layer manner, the system comprising:
a melt pool configured to retain and dispense an electrically resistive material;
an array of channels in fluid communication with the melt pool;
an array of hollow electrically conductive nozzles wherein each of the nozzles is coupled to a distal end of one of the channels such that the material is configured to flow from the melt pool to each of the nozzles;
a plurality of drivers in electric communication with the array of nozzles wherein each of the drivers is configured to modulate a voltage of one of the nozzles;
a grid spaced from the array of nozzles; and
a build platform;
wherein the drivers selectively generate an electrical potential difference between the individual nozzles and the grid and the build platform to selectively launch drops of the material from each nozzle through the grid and onto an accumulating support on the build platform.

2. The additive manufacturing system of claim 1, wherein the material comprises a metal or a polymer.

3. The additive manufacturing system of claim 1, wherein a diameter of the drops is varied by manipulating the electrical potential difference.

4. The additive manufacturing system of claim 1, wherein an average diameter of the drops ranges from about 10 micrometers to about 100 micrometers.

5. The additive manufacturing system of claim 1, further comprising a chiller configured to cool the accumulating support on the build platform.

6. The additive manufacturing system of claim 1, and further comprising a heater within the melt pool.

7. The additive manufacturing system of claim 1, wherein the build platform is configured to move in a z direction.

8. The additive manufacturing system of claim 1, wherein the build platform is configured to move in the x-y plane.

9. The additive manufacturing system of claim 1, and further comprising a controller wherein the controller is configured to manipulate the drivers to selectively generate an electrical potential difference between the individual nozzles and the grid and the build platform to selectively launch drops of the material from each nozzle.

10. The additive manufacturing system of claim 9, wherein the controller is configured to control each driver of the plurality of drivers independent of each other.

11. The additive manufacturing system of claim 9, wherein the controller is configured to manipulate the electric potential difference of each driver of the plurality of drivers to control a droplet diameter from selected nozzles.

12. The additive manufacturing system of claim 1, wherein the grid and the build platform have a common electric potential.

13. The additive manufacturing system of claim 1, and further comprising a voltage amplifier configured to produce an electric potential between the nozzle and the grid.

* * * * *